United States Patent [19]
Watanabe et al.

[11] 3,829,894
[45] Aug. 13, 1974

[54] PARAMETRIC MAGNETIC SENSOR

[75] Inventors: Teruji Watanabe, Niza; Takasuke Fukui, Tokyo; Shizuo Suzuki, Kawasaki, all of Japan

[73] Assignee: Kokusai Denshin Denwa Kabushiki Kaisha, Tokyo-To, Japan

[22] Filed: Oct. 18, 1972

[21] Appl. No.: 298,572

[30] Foreign Application Priority Data
Oct. 22, 1971  Japan.............................. 46-83719
June 13, 1972  Japan.............................. 47-58206

[52] U.S. Cl.................. 360/111, 360/123, 360/125
[51] Int. Cl......................... G11b 5/30, G11b 5/34
[58] Field of Search............ 179/100.2 CF, 100.2 C, 179/100.2 CH, 100.2 MD, 100.2 R; 340/174.1 H, 174.1 F

[56] References Cited
UNITED STATES PATENTS
2,870,267  1/1959  Duinker et al............. 179/100.2 CF
3,189,828  6/1965  Chang....................... 179/100.2 CH
3,189,880  6/1965  Gratian ..................... 179/100.2 CH
3,242,269  3/1966  Pettengill.................. 179/100.2 CF
3,681,526  8/1972  Camras....................... 179/100.2 C FOREIGN PATENTS OR APPLICATIONS
924,593  4/1963  Great Britain............. 179/100.2 CF Primary Examiner—Alfred H. Eddleman
Attorney, Agent, or Firm—Robert E. Burns; Emmanuel J. Lobato; Bruce L. Adams

[57] ABSTRACT

A parametrically excited magnetic sensor, in which an inductance element is formed with a magnetic substance and a winding wound on the magnetic substance, in which a capacitor is connected in parallel to the winding to form a resonance circuit, in which an AC exciting current magnetic field is applied to the magnetic substance to generate a second harmonic oscillation wave having a frequency twice the frequency of the AC exciting current in the resonance circuit, so that a minute magnetic field is detected by utilizing a change in the phase of the second harmonic oscillation wave caused in accordance with the polarity of the minute magnetic field. The magnetic substance forms a part of magnetic circuit having a narrow gap so that the gap portion issued as a magnetic detecting head.

7 Claims, 20 Drawing Figures

PARAMETRIC MAGNETIC SENSOR

This invention relates to a parametric magnetic sensor for detecting a minute magnetic field utilizing a second harmonic oscillation caused by parametric excitation.

Conventional devices of this kind are a single-wire type magnetic sensor as disclosed in Japanese Pat. Publication No. 45-10031, and a differential type-magnetic sensor such as disclosed in U.S. Pat. application No. 96,190 now abandoned.

However, both of the above-described oscillator elements have a defect in that it is difficult to obtain high sensitivity to and high resolution of an external non-uniform magnetic field with them. Namely, in the case of the former element, when a magnetizer is placed near the head thereof, magnetic flux generated from the magnetizer passes through the magnetic wire comprising a conductive wire and a magnetic film disposed on the conductive wire thereof and then back from the opposite end of the head to the magnetizer after passing through the space neighboring the element. At this time, th oscillation phase of the element is determined dependent upon the polarity of the magnetizer, but the magnetic flux determining the phase leaks out from the element on its way from the head to the opposite end and does not reach the opposite end of the head having the strength with which it started. Further, while the magnetic flux having entered into the element returns to the magnetizer, it passes through a space of high magnetic resistance ($\mu = 1$), so that all of the magnetic flux developed by the magnetizer does not contribute to phase reversal of the element, and sufficient sensitivity cannot be obtained. Moreover, since magnetic flux is widely distributed in the vicinity of the head and the magnetizer, the spatial sensitivity pattern characteristic becomes broad and high spatial resolution cannot be obtained.

In the latter differential type magnetic sensor, the space through which the magnetic flux passes is short, so that sensitivity and spatial resolution are both improved as compared with those in the former sensor. However, in the case of employing these elements for character recognition, for example, their resolution is still insufficient.

For enhancement of the sensitivity and resolution of each element mentioned above, the magnetizer is divided into two parts: the one part is used as a magnetizer M and the other part as a magnetizer Ma; and if the magnetizer Ma held opposite in polarity to the magnetizer M is placed near the opposite end of the element from the head H simultaneously with the magnetizer M, the leakage flux will be decreased resulting in enhanced sensitivity and resolution. However, it is extremely difficult to place the magnetizers near the both ends of the element, that is, the head H and the opposite end therefrom, simultaneously and opposed in polarity.

An object having this invention is to provide a magnetic sensor of extremely sharp sensitivity pattern characteristics.

The principle, construction and operations of this invention will be clearly understood from the following detailed discussion taken in conjunction with the accompanying drawings, in which:

FIG. 9 is a perspective view illustrating an example of this invention;

Figure 1:
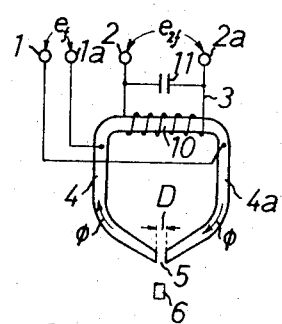
FIGS. 1, 2A, 2B, 3 and 4 are elevation views each illustrating an embodiment of this invention.

FIG. 1 shows an example of this invention, which corresponds to the single-type magnetic sensor. In FIG. 1, reference numerals 4 and 4a indicate yoke parts of such a construction that a magnetic wire comprising a conductive wire and a magnetic film disposed on the conductive wire of the inductance element having a straight part is extended so as to form a yoke part. The tips of the yoke parts are opposite to each other with a slight gap D therebetween, and the gap portion serves as the head 5. Upon impression of the exciting alternating voltage $e_f$, having a frequency $f$, across the excitation terminals 1 and 1a, so as to apply an alternating current magnetic field in the direction orthogonal to the axis of an inductor 3 wound on the straight part of the magnetic wire, and forming a parallel resonance circuit of frequency $2f$ together with a capacitor 11, a second harmonic voltage $e_{2f}$ having a constant amplitude and a frequency $2f$, twice that of the exciting voltage, is developed across the output terminals 2 and 2a of the resonance circuit. The field developed by the exciting voltage is orthogonal to the axis of the inductor 3 because the axis of the inductor is parallel to the straight part of the magnetic wire. Under this oscillation condition, when a magnetizer 6 is placed near the head 5, the magnetic flux from the magnetizer 6 efficiently enters into the one yoke part 4 by way of example, because the gap D is extremely narrow. The flux passes through the magnetic wire of the yoke part 4, the magnetic wire 10 of the inductance element and then the magnetic wire of the other yoke part 4a and returns from the head 5 to the magnetizer 6. Further, where the polarity of the magnetizer 6 is opposite to that in the above case, the magnetic flux enters into the yoke part 4a from the head 5 and passes through the magnetic wire 10 and the yoke part 4 and then returns to the magnetizer 6 from the head 5. As the magnetic flux, applied by the magnetizer 6 to the magnetic sensor, passes through the magnetic wire 10 of the inductance element, the phase of the second harmonic oscillation voltage $e_{2f}$ is determined according to the direction of the applied flux. As a result of such an arrangement of the single-type magnetic sensor, when the magnetizer 6 approaches near the head 5, it is possible to obtain the same results as those obtainable by simultaneously bringing magnetizers of opposite polarities to the vicinity of both ends of a straight magnetic wire of the inductance element in the former conventional sensor. Moreover, the gap D of the head 5 can be made narrow as compared with the width of the magnetizer 6, so that substantially no leakage flux occurs so the magnetic flux is effectively used, thereby further enchancing sensitivity. Furthermore, since the gap D of the head 5 can be made small spatial, resolution can also be enhanced.

Figure 2A:
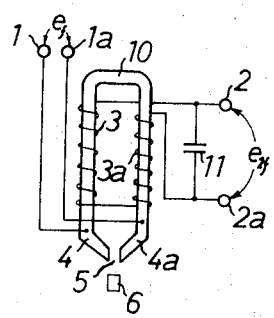
Figure 2B:
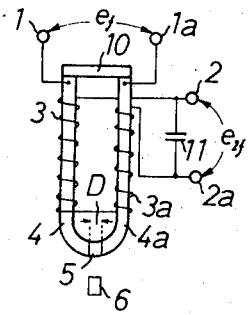

FIGS. 2A and 2B illustrate examples of the differential type magnetic sensor according to invention. In FIG. 2A, a magnetic wire is bent so that both its ends are disposed adjacent to each other with the gap D therebetween to form the sensor head 5, and windings 3 and 3a are wound on the parallel magnetic wire parts 4 and 4a, respectively, to provide two series-connected inductance elements. In FIG. 2B, a magnetic wire, having a magnetic film disposed thereon, is bent in a U-letter configuration, and the magnetic film coated on the magnetic wire is removed at the top of the bent portion by photo-etching techniques either partly around or all around the wire to form the narrow gap D, and windings 3 and 3a are wound on the parallel magnetic wire parts 4 and 4a, respectively, to form two series-connected inductance elements, thus providing a differential type magnetic sensor. In this case, the open end portion between the ends of the magnetic wire may be left open. If a magnetic member of insulative magnetic substance such as ferrite is bridged between the ends of the wire, sensitivity and resolution of the magnetic sensor becomes higher than those in the case of the open end portion being left as it is. Further, the construction of FIG. 2B facilitates the formation of the gap D as compared with the construction of FIG. 2A. These examples of embodiments of magnetic sensors are characterized by enhanced sensitivity and resolution, as compared with the conventional magnetic sensors, and retain the feature of the prior differential type magnetic sensor that it is not susceptible to the influence of an external uniform magnetic field.

Figure 3:
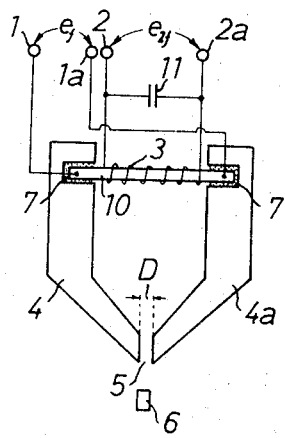
Figure 4:
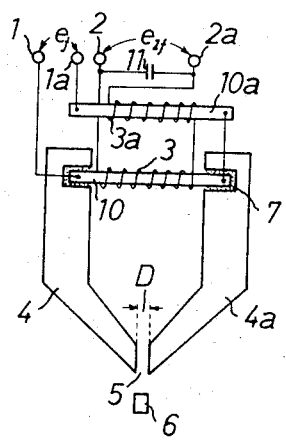

FIGS. 3 and 4 show other examples of this invention, which are both designed so that it is not necessary to consider magnetostriction which presents a problem where a bent magnetic wire is used as in FIGS. 1, 2A and 2B.

Figures 5A, 5B, 5C, 6:
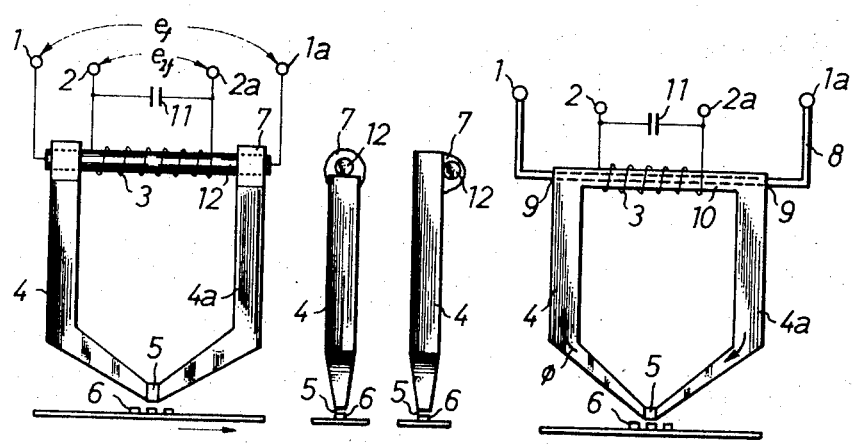
FIGS. 5A, 5B and 5C are an elevation, and side views illustrating an example of this invention and a modification thereof.
FIGS. 6, 7 and 9 are elevation views each illustrating another example of this invention.

FIG. 3 is an example of this invention embodying a single-type magnetic sensor. Reference numerals 4 and 4a indicate magnetic members, which are disposed in the same plane in the opposing relation to each other as shown. The gap D is provided between the magnetic members 4 and 4a at one end thereof to form the head 5, and the magnetic wire 10 making up the inductance element is attached to the other ends of the magnetic members 4 and 4a by means of, for example, adhesive binder 7 containing magnetic powder, thus supporting the inductance element with the magnetic members 4 and 4a. In this case, the magnetic members 4 and 4a forming the head 5 and the magnetic path may be formed of ferrite, or it is also possible to form a narrow gap by photo-etching a permalloy film vapor-deposited or electro-plated on a substrate. The magnetic wire of the inductance element may be fixedly attached by ferrite to the magnetic members 4 and 4a and, in the case of the magnetic members 4 and 4a being of ferrite, grooves may be provided in the ferrite, in which the magnetic wire 10 may be inserted and fixed therein by paste. Grooves may be replaced by openings as shown in FIGS. 5A, 5B and 5C.

FIG. 4 illustrates an example of this invention as being applied to a differential type magnetic sensor, in which the gap D is formed between the magnetic members 4 and 4a at one end thereof to provide the head 5 and one of the two inductance elements 10 and 10a is fixedly held between the other ends, as is the case of FIG. 3.

The operations of the magnetic sensors shown in FIGS. 3 and 4 are exactly the same as those of the magnetic sensors of FIGS. 1 and 2A or 2B respectively.

In the foregoing, the gap of the head portion 5 defined by the yoke parts of the magnetic wire is an air gap but if a magnetic insulating material is inserted and fixed in the gap, the gap can easily be formed having a predetermined width and is unaffected by shocks after fabrication and mechanically stable.

As has been described in the foregoing, in the present invention, by adding simple yokes of a magnetic material to both ends of an inductance element and by providing at the both ends of the inductance element opposite to each other with a magnetic gap to form a magnetic detecting head, not only the magnetic detecting ability of the magnetic detecting head can be improved but also resolution can greatly be improved because the gap of the head can be held about several microns. Accordingly, if employed for reading out magnetic recorded information the yoke type parametric magnetic sensor of this invention enables reading out the information with high sensitivity and high resolution.

In FIG. 6 showing another example of this invention, reference numerals 4 and 4a designate yoke parts formed of a magnetic substance. A narrow gap, in which an insulator is usually disposed, is formed between the both yoke parts at one end thereof as indicated by a reference numeral 5 and the other ends of the both yoke parts 4 and 4a are bridged. A bore 9 is formed through a bridge part 10 formed as a unitary structure with the both yoke parts. These respective parts are formed as a unitary structure. A reference numeral 8 designates a conductor inserted into the bore 9 formed in the bridge part 10. By the application of an excitation voltage $e_f$ across its terminals 1 and 1a, the conductor 8 is caused to act as an exciting wire to magnetize the neighboring magnetic members by the generated exciting magnetic field. A winding 3 is wound on the bridge part 10 and a capacitor 11 is connected across both ends of the winding 3 to provide a resonance circuit resonant at the frequency $2f$ and output terminals 2 and 2a are provided. A reference numeral 6 indicates a magnetic having information content object to be detected which is, for example, recorded in magnetic ink or the like by handwriting, printing or typing on a printing sheet or magnetically recorded on a magnetic recording medium such as magnetic sheet.

If the alternating voltage, having a frequency $f$, $e_f$ is applied across the terminals 1 and 1a so an excitation current flows in the excitation conductor 8, the bridge part 10 is subjected to parametric excitation of the frequency $f$, by which an oscillation voltage of the frequency $2f$ having a substantially constant amplitude is induced in the resonance circuit consisting of the winding 3 and the capacitor 11. At this time, a DC voltage whose polarity is determined so as to predetermine an initial oscillation phase of the voltage $e_{2f}$ developed in the resonance circuit in view of the polarity of the magnetic information object 6 to be detected, is applied across the terminals 2 and 2a. Under such conditions, when the magnetic information object 7 approaches the gap of the head 5, the magnetic flux developed by the magnetic information object 6 enters into the yoke 4 from the one end of the gap and passes through the bridge part 10 and the yoke 4a and then returns to the gap through the winding 3, thus reversing the phase of the oscillation of $e_{2f}$ by a phase "$\pi$." Namely, if the oscillation phase of $e_{2f}$, dependent upon the external magnetic field sensed by the sensor at the beginning of the oscillation is, for example a phase 0," it is reversed to a phase "$\pi$" by the approach of the magnetic information object 6. In this case, means for detecting the reversal of the oscillation phase is a phase detector, a comparing detector using a reference phase carrier or the like. There is the possibility that a single-type magnetic sensor using a ferrite core is subject to the influence of stray uniform magnetic fields, such as the earth magnetism. This can be avoided in the following manner.

Figures 7, 8:
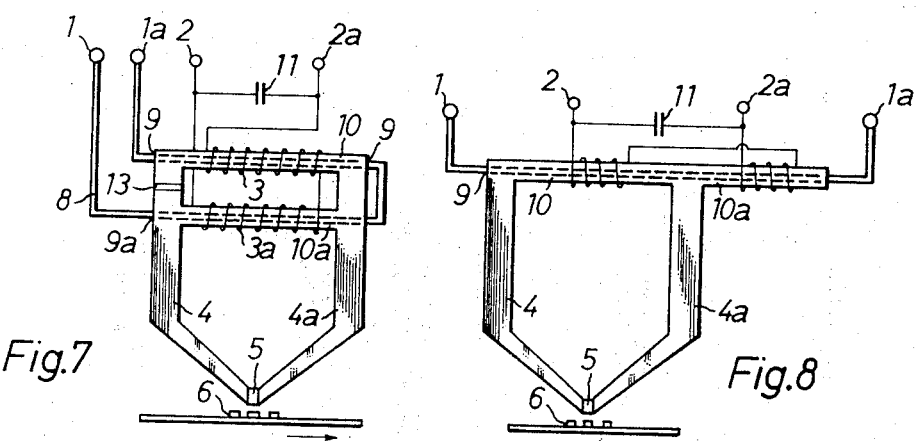

FIG. 7 shows another magnetic sensor of yoke type construction in which parallel differential elements are formed with a magnetic core as a unitary structure. It is important that bridge parts 10 and 10a having bores 9 and 9a for the conductor 8 to be inserted are formed by sintering simultaneously with the yoke parts 4 and 4a and that they are of the same size and disposed in parallel to each other. The conductor 8 is inserted into the bores 9 and 9a of the bridge parts 10 and 10a in opposite directions, respectively. On the bridge parts 10 and 10a, windings 3 and 3a are wound and these oscillation windings 3 and 3a are interconnected so that voltages induced in them by a uniform magnetic field cancel each other when viewed from the output terminals 2 and 2a of the resonance circuit. In one of the connection portions between the bridge parts 10 and 10a which lies on the side of the exciting terminals of the conductor 8, an air gap 13 is formed or reinforced with a magnetic substance of low permeability or a non-magnetic substance other than that of bridge parts 10 and 10a.

Upon application of the excitation voltage $e_f$ across the terminals 1 and 1a, the output voltage $e_{2f}$ having a frequency twice the frequency of excitation voltage $e_f$ is developed at the terminals 2 and 2a. In this case, as described previously, voltages induced in the windings 3 and 3a by an external stray magnetic field (regarded chiefly as a parallel magnetic field by a magnetizer placed at a long distance) cancel each other and do not appear between the terminals 2 and 2a. Accordingly, where a magnetizing source is a uniform magnetic field at a long distance from the sensor, no influence of its magnetism appears between the second harmonic output terminals 2 and 2a of the magnetic sensor of the above construction. Also in this element, the initial oscillation phase of the second harmonic $e_{2f}$ is dependent upon the polarity of a magnetic field of an extremely low intensity (for example, a residual magnetism of a magnetic field determined by the polarity of an external DC current applied to the coils or the like) which is present in the windings 3 and 3a of the resonance circuit at the beginning of the excitation. Moreover, as is the case with the aforesaid single-type magnetic sensor, when the magnetizer 6 approaches the head 5, its magnetic flux strongly interacts with one, for example, 3a of the windings 3 and 3a but does not interact as strongly with the other 3, and the phase of second harmonic oscillation voltage developed across the terminals 2 and 2a is reversed by a phase "$\pi$" by the magnetization of the winding 3a and the bridge part 10a, thus indicating the presence of an external magnetic field.

In order that the second harmonic oscillation may also be in a predetermined phase when the magnetizer 6 does not lie in the vicinity of the head 5, an extremely small magnet is placed at an appropriate position on the yoke, or a minute DC current is always applied in the oscillation windings 3 and 3a in a constant direction to provide a minute constant magnetic field, thereby ensuring that the oscillation is maintained in the predetermined phase at all times.

FIG. 8 illustrates a magnetic sensor which is constructed for the purpose similar to that of FIG. 7 and in which the construction of the second harmonic oscillation element is a straight differential type one. In this construction, one end of one bridge part 10 is extended and the extended part is used as the bridge part 10a, windings 3 and 3a are wound thereon so that the bridge parts 10 and 10a may be of a straight differential type. Reference numerals 4 and 4a indicate yoke parts, the tips of which serve as a head having a narrow gap 5. A reference numeral 6 identifies a magnetic object having information content to be detected which is recorded on a substrate. As in the foregoing cases of FIGS. 6 and 7 the presence of the magnetic object can be determined by detecting whether the oscillation phase of the second harmonic oscillation voltage $e_{2f}$ is equal to a phase "0" or "$\pi$".

Figures 9, 10:
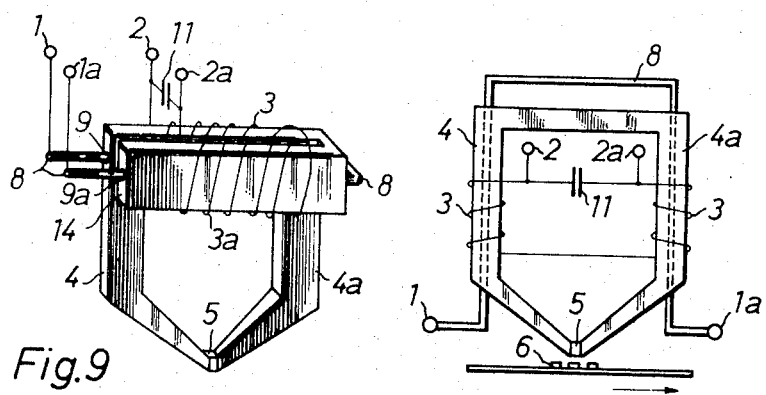
FIG. 10 is an elevation view illustrating another example of this invention.

FIG. 9 shows a modified form of the parallel differential type magnetic sensor of FIG. 7. The bridge 10a is disposed in the direction of the thickness of the yoke. In this case, an air gap portion 14 may be reinforced with a low permeability magnetic member or a non-magnetic member as is the case of FIG. 7.

The foregoing description has been given of magnetic sensors in which the bore for the conductor is formed in the bridge part, but it is also possible to form the bores in the yoke parts 4 and 4a, to insert the conductor 8 thereinto and to wind the windings 3 and 3a on the yoke parts respectively as depicted in FIG. 10.

The conductor 8 may be inserted into the bores prior to the sintering of the magnetic members.

Further, the foregoing has described that the magnetic members in the embodiments shown in FIGS. 6, 7, 8, 9, and 10 are ferrite but it is a matter of course that where electric power consumption and sensitivity are not so important, other magnetic substance can be used.

The magnetic sensor of this invention can also be constructed by thin film techniques and photo-etching techniques. This will hereinbelow be described.

Figure 11:
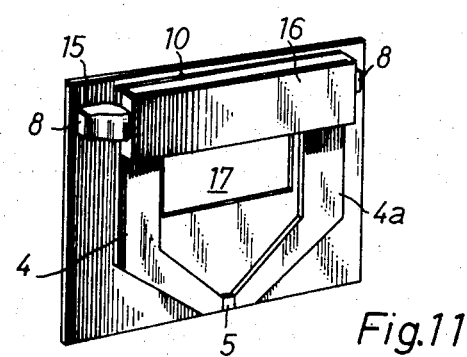
FIGS. 11 and 12 are perspective views explanatory of the construction of an example of this invention.

FIG. 11 shows a thin film magnetic substrate which corresponds to a portion of a magnetic sensor on which a winding is wound to form a resonance circuit, and corresponds to the bridge part 10 and yoke parts 4 and 4a in FIG. 6. Magnetic thin films 4 and 4a and a bridge part 10 are disposed on a substrate 15 and are subjected to photo-etching to form a closed magnetic path including a gap 5 and yoke parts 4 and 4a. Then, a conductor 8 is deposited on the bridge part 10 and the conductor 8 is covered with a magnetic thin film 16, so that the conductor 8 is thus covered with the bridge part 10 and the magnetic thin film 16 to constitute a closed magnetic path in the direction of the periphery of the conductor 8. The structure of FIG. 11 will be referred to as a fundamental part.

Figure 12:
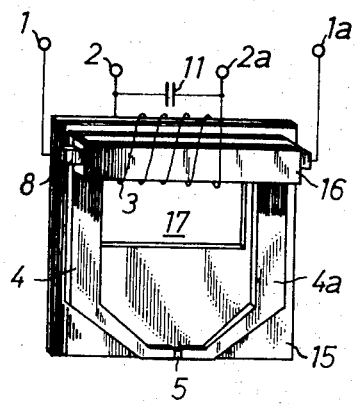

As shown in FIG. 12, a winding 3 is wound on the aforesaid fundamental part and a resonance circuit is formed with a capacitor 11, thus providing a thin film integrated magnetic sensor.

Figure 13:
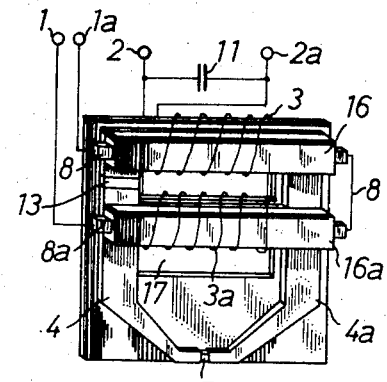
FIG. 13 is a perspective view illustrating an example of this invention.

In FIG. 13, another assembly of a conductor 8a and a magnetic thin film 16a is further provided on the fundamental and is disposed between the first assembly of conductor 8 and magnetic thin film 16 and the head 5 and a portion 13 of the yoke part 4 between the conductor 8a and the film 16a is removed to form an air gap or replaced with a non-magnetic member. Windings 3 and 3a are wound on the conductor 8 and the magnetic thin film 16 and 8a and 16a, respectively, and the windings are interconnected in series to form the resonance circuit together with the capacitor 11. The conductors 8 and 8a are connected in series to each other and, by applying an excitation voltage to them, a second harmonic oscillation voltage is developed across the capacitor 11, thus the function of the magnetic sensor as described previously is obtained.

Figure 14A:
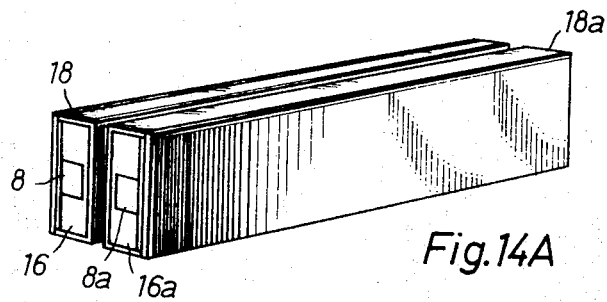
FIGS. 14A and 14B are perspective views explanatory of another example of this invention.
Figure 14B:
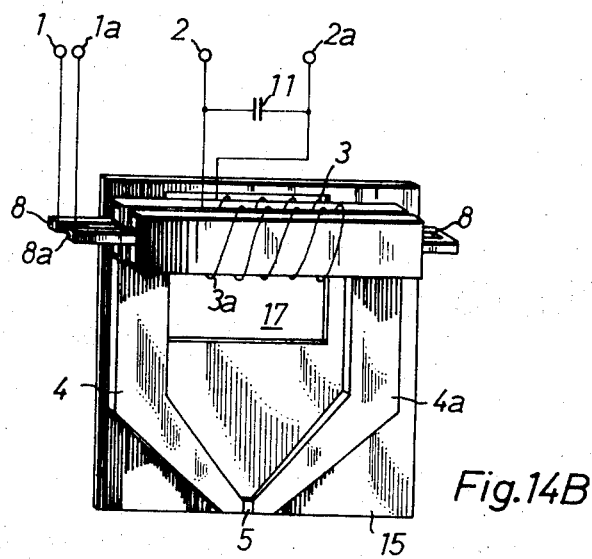

FIGS. 14A and 14B illustrate a modified form of the example of FIG. 13, in which the assembly of the conductor 8 and the magnetic thin film 16 is disposed in a direction perpendicular to the substrate 15. In FIG. 14A yoke parts 4 and 4a are mounted on substrate 15 and 15a, on which conductors 8 and 8a are formed and, further, magnetic thin films 16 and 16a are deposited to cover them. In this case, the portion 13 in FIG. 13 is usually left in the form of an air gap but a non-magnetic member may also be inserted therein. The other constructions are substantially the same as those in FIG. 13.

Figure 15A:
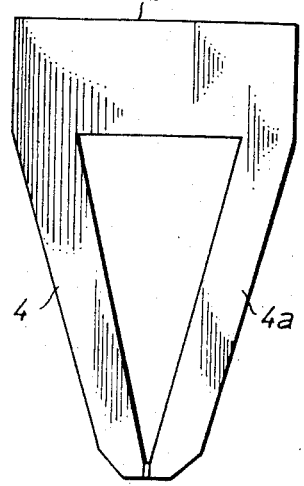
FIGS. 15A and 15B are an elevation and a perspective view explanatory of another example of this invention.
Figure 15B:
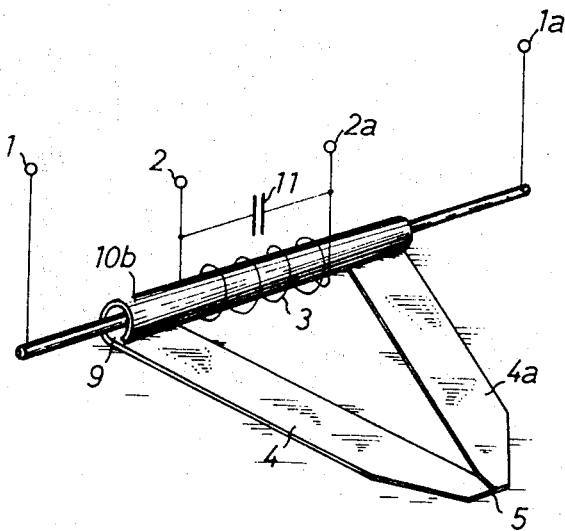

FIGS. 15A and 15B show an example of a a magnetic sensor of the same type as that of FIG. 6 made of a sheet metal of magnetic substance. FIG. 15A is a plan view of a punched magnetic sheet such as permalloy. Reference numerals 4 and 4a indicate yoke parts and, 5 a gap part, which may be an air gap or in which a non-magnetic insulator may be inserted for reinforcing the yoke parts 4, 4a or to retain the gap as predetermined. A reference numeral 10b designates a part which is rolled up in the direction of the yoke parts 4 and 4a, and 9 a void area formed as a result of punching. FIG. 15B shows the construction of the magnetic sensor according to this example, in which a conductor 8 is inserted into the cylindrically rolled magnetic member (not limited to one turn) and a winding 3 is wound thereon to form a resonance circuit with the winding and a capacitor 11.

It is a matter of course that this example is not limited specifically to the sensor of the type shown in FIG. 6 but can also be applied to those of the other examples such, for example, as in FIG. 10 by forming cylindrical members for the yoke parts 4 and 4a.

Since this type is simple to manufacture and inexpensive uses a rolled magnetic sheet and it is of particular utility in the case of a magnetic sensor which operates at a low frequency and is not required to have high sensitivity.

As has been described in the foregoing, in the present invention, a yoke type magnetic core having a bore for an exciting wire to be inserted therein is provided in a magnetic sheet, a magnetic substance such as ferrite or a substrate having deposited thereon a magnetic film, and since the exciting wire is inserted into the bore to form an orthogonal excitation type second harmonic magnetic sensor the resulting magnetic sensor is free from characteristic deterioration due to non-uniformity in the production characteristics or magnetostriction such as encountered in a magnetic sensor utilizing a magnetic wire. Accordingly, the magnetic sensors of this invention are remarkably simple to fabricate, suitable for mass production, and hence extremely inexpensive.

What we claim is:

1. A parametric magnetic sensor comprising, sensing means receptive in operation of an oscillating excitation signal having a frequency $f$ for sensing an external magnetic field, said sensing means comprising means for developing in operation an output signal having a substantially constant amplitude, a frequency $2f$, and having one of two phases differing by $\pi$ radians and determined by said external magnetic field being sensed, said sensing means comprising a conductor having a straight portion having a longitudinal axis and comprising input means for receiving said excitation signals, magnetic circuit means having a portion disposed on said straight portion of said conductor and being provided with a gap in a portion remote from said straight portion of said conductor, an inductor wound around said portion of said magnetic circuit means disposed on said straight portion of said conductor and having a longitudinal axis of symmetry parallel to said longitudinal axis of said straight portion of said conductor, a capacitor connected in parallel with said inductor to form a resonant output circuit therewith having a resonance frequency $2f$, and said output circuit comprising output means for providing said output signal having a frequency $2f$.

2. A parametric magnetic sensor according to claim 1, in which the magnetic circuit is entirely formed by a magnetic wire having the narrow gap, the magnetic wire being formed by a conductor and a ferromagnetic thin film coated on the conductor.

3. A parametric magnetic sensor according to claim 1, in which the magnetic circuit is formed by a magnetic wire of U-letter configuration and a magnetic yoke, the magnetic wire being formed by a conductor and a ferromagnetic thin film coated on the conductor except the narrow gap.

4. A parametric magnetic sensor according to claim 1, in which the magnetic circuit is formed by a magnetic wire and a pair of yokes having the narrow gap, the pair of yokes being magnetically connected to the ends of the magnetic wire at respective ends of the yokes opposite to the narrow gap, the magnetic wire being formed by a conductor and a ferromagnetic thin film coated on the conductor.

5. A parametric magnetic sensor according to claim 1, in which the magnetic circuit is formed by a ferrite yoke having the narrow gap and at least one bore, an exciting conductor being inserted in the bore.

6. A parametric magnetic sensor according to claim 1, in which the magnetic circuit is formed by a ferromagnetic thin film having the narrow gap and deposited on a substrate.

7. A parametric magnetic sensor according to claim 1, in which the magnetic circuit is formed by a magnetic sheet having the narrow gap and a rolled-up to provide a substantially straight bore, an exciting conductor being inserted in the bore.

\* \* \* \* \*